United States Patent
Joshi

(10) Patent No.: US 9,614,756 B2
(45) Date of Patent: Apr. 4, 2017

(54) VOIP ROUTE SELECTION USING CALL METRICS

(71) Applicant: Prabodh Joshi, Windsor, CO (US)

(72) Inventor: Prabodh Joshi, Windsor, CO (US)

(73) Assignee: CA, Inc., New York, NY (US)

( * ) Notice: Subject to any disclaimer, the term of this patent is extended or adjusted under 35 U.S.C. 154(b) by 208 days.

(21) Appl. No.: 14/667,827

(22) Filed: Mar. 25, 2015

(65) Prior Publication Data

US 2016/0285752 A1   Sep. 29, 2016

(51) Int. Cl.
*H04W 4/00* (2009.01)
*H04L 12/725* (2013.01)
*H04L 12/751* (2013.01)
*H04M 7/00* (2006.01)

(52) U.S. Cl.
CPC ............ *H04L 45/302* (2013.01); *H04L 45/02* (2013.01); *H04M 7/00* (2013.01); *H04M 7/0075* (2013.01)

(58) Field of Classification Search
USPC ....................................................... 370/252
See application file for complete search history.

(56) References Cited

U.S. PATENT DOCUMENTS

| | | | |
|---|---|---|---|
| 7,586,899 B1* | 9/2009 | Mohaban | H04L 29/06027 370/352 |
| 2006/0195881 A1* | 8/2006 | Segev | H04N 21/23439 725/116 |
| 2006/0239184 A1* | 10/2006 | Moore | H04L 12/5695 370/229 |
| 2007/0291648 A1* | 12/2007 | Pfleging | H04L 12/2602 370/237 |
| 2013/0034016 A1* | 2/2013 | Bai | H04W 40/28 370/254 |
| 2014/0033242 A1* | 1/2014 | Rao | H04N 21/442 725/14 |
| 2014/0297805 A1* | 10/2014 | Chaplot | H04L 65/608 709/219 |
| 2016/0105728 A1* | 4/2016 | Schmidmer | H04N 21/44008 725/110 |

\* cited by examiner

*Primary Examiner* — Farah Faroul
(74) *Attorney, Agent, or Firm* — Baker Botts L.L.P.

(57) ABSTRACT

A method includes determining quality-of-service (QoS) metrics for each of a plurality of data streams routed by a node according to a stream-routing ratio that specifies a proportion of total data streams to be routed over each of a plurality of network paths. The method also includes determining a quality score for each of the plurality of network paths based on the QoS metrics. The method further includes modifying the stream-routing ratio based on the quality scores for the plurality of network paths to produce a modified ratio for routing new data streams, the modified ratio being selected to leverage particular ones of the plurality of network paths having high quality scores. The method still further includes applying the modified ratio to the node.

20 Claims, 2 Drawing Sheets

US 9,614,756 B2

VOIP ROUTE SELECTION USING CALL METRICS

BACKGROUND

The disclosure relates generally to VOIP route selection, and more specifically to VOIP route selection using call metrics.

SUMMARY

According to one embodiment of the disclosure, a method includes determining quality-of-service (QoS) metrics for each of a plurality of data streams routed by a node according to a stream-routing ratio that specifies a proportion of total data streams to be routed over each of a plurality of network paths. The method also includes determining a quality score for each of the plurality of network paths based on the QoS metrics. The method further includes modifying the stream-routing ratio based on the quality scores for the plurality of network paths to produce a modified ratio for routing new data streams, the modified ratio being selected to leverage particular ones of the plurality of network paths having high quality scores. The method still further includes applying the modified ratio to the node.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
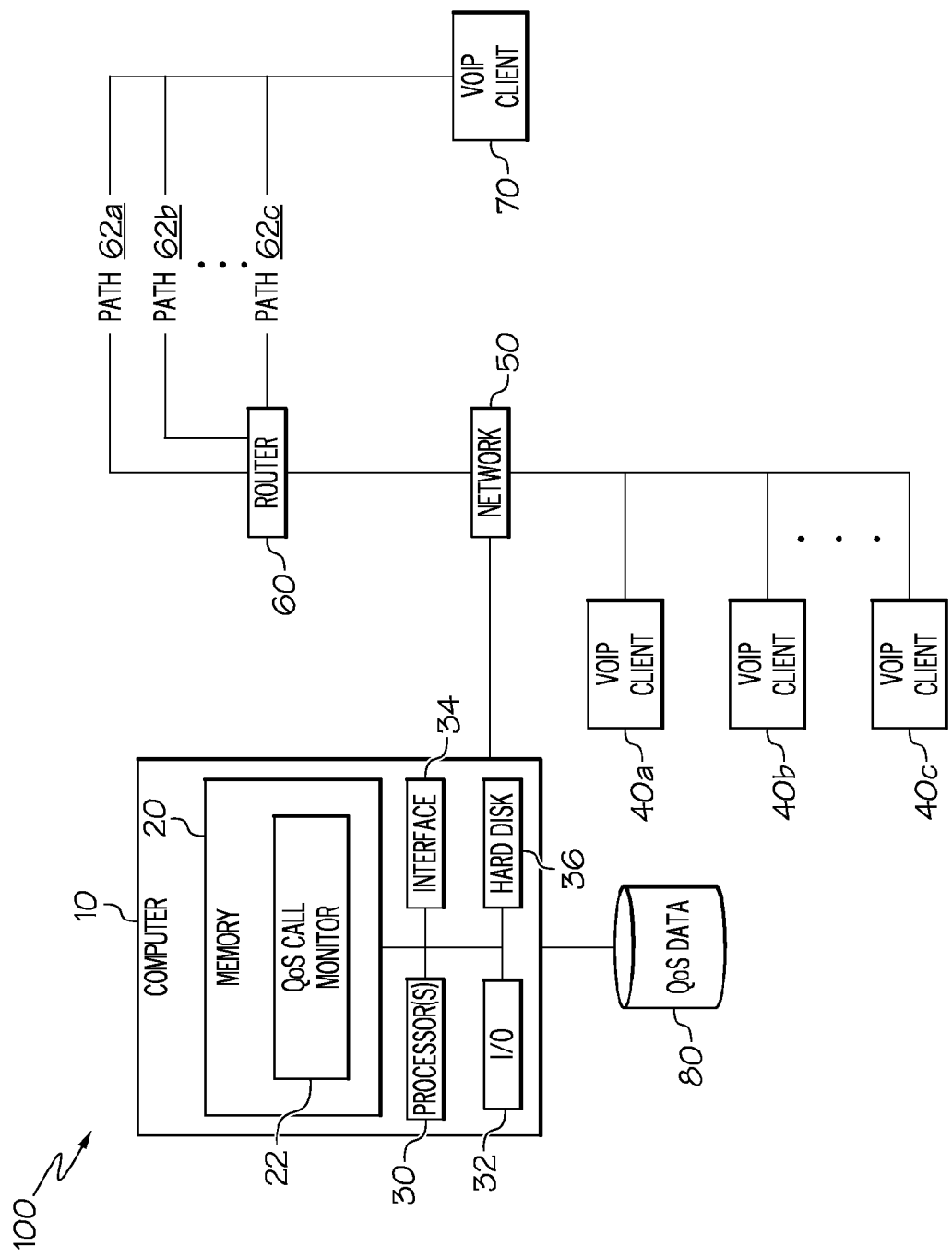
FIG. 1 illustrates a block diagram of a system for VOIP route selection using call metrics in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Communications monitoring systems track and analyze network-based communications including voice over internet protocol (VoIP) and streaming video for organizations, private users, or other customers. These systems perform management operations that help organizations ensure unified communication quality of experience, as well as network quality of service (QoS). These systems link quality of experience through VoIP and video monitoring and reporting with additional data collection and analysis to provide a comprehensive picture of how networks support real-time applications. VoIP and video management solutions can additionally help organizations manage voice, video, and data over a single IP network.

Certain communication monitoring systems may additionally integrate with tools that manage underlying IP data networks and manage QoS policies to help ensure that voice and video transmission as well as critical business applications achieve optimal performance. These monitoring systems assess performance of communications environments by tracking, evaluating and reporting on key metrics. Voice and video quality measurements may be displayed against thresholds for network segments in reports. These solutions may not require any server agents or client probes, and thus may improve the quality of VoIP and video services, help administrators achieve faster problem resolution, and improve capacity planning and updates without significant investment in infrastructure or set up time. However, some systems may require monitoring agents and/or probes for collection of QoS data.

Certain communications monitoring systems may be connected to a gateway router and may be capable of controlling, monitoring, or modifying router settings. The router may be connected to various internet service provider networks for transmitting communications over long distances to other users on a network. For example, a communications management system may be connected to a router with access to several tier one networks. The communications monitoring system may select a gateway or router for data packets associated with a particular communication stream by choosing between various tier-one network routes. Network routes may be selected based on QoS data for previous or concurrently transmitted communication streams. For example, the network route carrying communication streams with the highest rated QoS metrics may be selected for transmitting future communication streams. Such a route selection process ensures the highest quality network routes are selected for transmitting calls. In certain embodiments, communications monitoring systems for controlling route selection policies may be embedded within a router.

Data streams may include groups of packets that are associated with a particular communication session. For example, a packet inspection process may determine that several packets transmitted in a packet-switched network are related by inspecting properties of the transmitted packets, such as destination and source IP addresses, protocol, and application specific aspects of the packets. The payload of a VoIP data packet may include a session ID field that uniquely identifies the communication session and is used by a particular communications application for maintaining call records or the like.

Communications monitoring systems may control the flow of traffic through a router, for example, by applying a routing policy to a router. In certain embodiments, a communications monitoring system may perform traffic routing by monitoring and configuring router settings as traffic is received. Thus, a communications monitoring system may select routes for data streams.

The teachings of the present disclosure as discussed in connection with the embodiments presented herein may include implementation using one or more routers. Those of ordinary skill in the art will appreciate that the term "router" as used herein may refer to any type of device used in a packet switched network including without limitation gateways, session boarder controllers, access servers, voice gateways, hubs, switches, access points, and/or any VoIP switching device.

Routing policy and data stream routing may be implemented by identifying data streams transmitted by a router using the communications monitoring system and routing packets corresponding to a particular data stream along a predetermined or dynamically assigned route. For example, the communications monitoring system may identify packets associated with a particular data stream by inspecting packets using, for example, the attributes described above, and routing each individual packet along the path assigned to the data stream. Call quality and other metrics may be analyzed to determine optimal routes. Thus, a communications monitoring system may dynamically route data streams for communication sessions to increase performance and optimize other aspects of communication sessions.

In certain embodiments, the route selection process results in generation of a call routing plan such as, for example, a preferred network path with overflow cases and/or a call routing ratio, that is applied generally to all incoming communication sessions received at a particular router or node controlled or monitored by a communications monitoring system. A call routing plan including a preferred path with overflow cases includes determining a particular preferred network path based on call quality metrics and routing most and/or all network traffic received over the preferred network path. The preferred network path may have a certain bandwidth limitation as determined dynamically by the system or based on network traffic increasing past a predetermined threshold level, for example a threshold bandwidth level allocated to a particular carrier. Once the bandwidth limitation is exceeded, the call routing plan specifies one or more additional overflow network path, and in some embodiments ranks each additional overflow network path based on quality of service metrics and routes calls along the overflow network routes according to the overflow rankings while the preferred path's utilization is above the bandwidth limitation.

A call routing ratio specifies the proportion of total communication streams transmitted over one or more network routes. A typical call routing ratio for a communications management system connected to three tier-one networks may be 1:2:3. That is to say, for every four communication streams monitored by the communications management system, ⅙th are routed over a first network route, ⅓rd are routed over a second network route, and ½ are routed over a third network route.

Call routing ratios may be modified for various reasons including performance optimization, cost reduction, and avoidance of network errors. For example, if three possible network routes utilizing three different tier-one internet service provider networks are each monitored for QoS metrics, the call routing ratio may be modified based on analysis of the metrics in order to achieve a specific goal, such as increasing call quality, reducing cost associated with utilization of particular network routes, lines, or other infrastructure, and/or avoiding particular network routes during a particular time of day. In certain embodiments, relative security of each network path may be a factor in determining call routing ratios.

Analysis of QoS metrics may also be used to modify the network route for a particular data stream during transmission. For example, if a communications management system determines that a significant increase in call quality can be achieved by re-routing data packets in a first data stream, such as data packets associated with a first VoIP data communications connection, those packets may be re-routed automatically to improve service of the first VoIP data communications connection. These changes may be determined dynamically, such as in real-time as a communications session is in progress, in order to automatically improve service or optimize other metrics. The information may also be used in modifying a call-quality ratio for future data streams.

With reference to FIG. 1, a system 100 for call routing based on path quality is illustrated in accordance with a non-limiting embodiment of the present disclosure. System 100 includes a computer 10, VoIP clients 40a-c, QoS database 80, router 60, and VoIP client 70 each connected by network 50. Computer 10 includes a memory 20, processor(s) 30, input/output 32, interface 34, and hard disk 36. Processor 30 loads instructions from a computer-readable medium, such as hard disk 36 into memory 20 and executes instructions in memory 20. For example, processor 30 executes a QoS call monitor process 22 in memory 20. QoS call monitor process 22 provides various functions regarding VoIP and other packet-switched network communications. For example, QoS call monitor process 22 monitors network traffic for a particular component in an enterprise network. In this example, QoS call monitor process 22 monitors network traffic for router 60. Router 60 connects several VoIP clients, such as VoIP clients 40a-c and VoIP client 70 to each other, over one or more network paths 62a-c. Network paths 62a-c may represent various paths of how to reach the same destination VoIP client. Network paths 62a-c may include various tier-one internet service provider paths. QoS call monitor process 22 may measure QoS metrics associated with each path 62a-c at router 60 and store QoS metrics in QoS database 80. In certain embodiments, a different system stores call and path quality metrics in QoS database 80 and QoS call monitor process 22 retrieves this information.

QoS call monitor process 22 may additionally control call routing or data stream routing functions of router 60. For example, router 60 may have a routing policy that specifies particular call routes, paths, gateways, or other information regarding routing of particular network traffic that it receives. QoS call monitor process 22 may perform analysis of call quality metrics and other information and modify router 60 routing configuration policies accordingly in order to achieve some goal, such as optimizing call quality and performance for communications for a particular organization. The teachings of the present disclosure may be adapted for use in virtually any scenario. For example, a VoIP service provider may use such a system to control and optimize call routes for customers using its service.

QoS call monitor process 22 may track or monitor call quality metrics. The call quality metrics may include subjective call quality scores, such as a mean opinion (MOS) score. The MOS score includes a range from 1 to 5, with 5 being the highest. MOS scores include analysis of a test call for conversational and listening quality (MOS-CQ) and (MOS-LQ) respectively. MOS-LQ is a commonly used MOS value that measures the quality of audio for listening purposes only. MOS-LQ may not take into account any bidirectional effects, such as delay and echo, but may account for listening quality in each direction and bidirectional effects. MOS-CQ is a prediction of the narrowband conversational quality of the audio stream that is played to the user. This value accounts for listening quality of the audio played and sent across the network, speech and noise levels for both audio streams and echoes, and represents how a large group of people would rate the quality of the connection for having a conversation.

Call quality metrics may also include other factors such as delay, jitter, R-Factor, Answer Seizure Ratio (ASR), latency, packet loss, Network Effectiveness Ratio (NER) and average call duration (ACD).

Call quality metrics may include various types data for determining the quality of a particular network route based on empirical data. For example, historical data my include data from various previous calls over the course of the past day, week, month, year, or any other time period. Historical call quality data may also exhibit different behaviors on particular days, such holidays, weekends, evenings, and the like. QoS call monitor process 22 may take these behaviors into account when making determinations regarding real-time call routing decisions.

Figure 2:
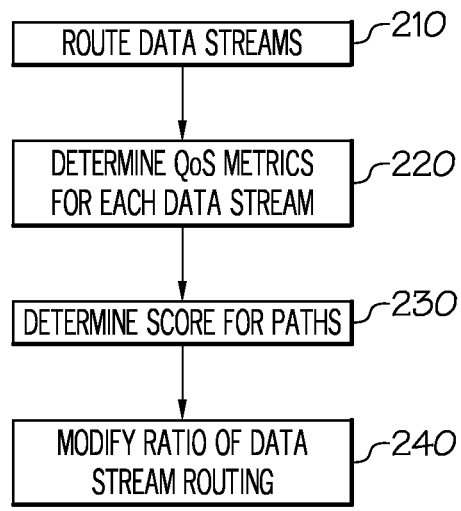
FIG. 2 illustrates a flow chart of a method for VOIP route selection using call metrics in accordance with a non-limiting embodiment of the present disclosure.

With reference to FIG. 2, a method for call routing based on path quality is illustrated in accordance with another non-limiting embodiment of the present disclosure. At step 210, data streams are routed in connection with servicing one or more VoIP communication sessions. For example, a router routes communications from various communication clients within an organization or region. The router may be located with an interface to a plurality of network paths. For example, the router may be located at a central point with access to several tier-one internet service provider networks are located. As another example, the router may direct packets to a particular gateway with access to one or more of the network paths.

Data streams include a collection of data packets transmitted in a packet-switched network that are each associated with a particular IP communication. For example, a VoIP conference call includes a variety of participants that each transmits data packets between each other and a central communications hub, such as a server. Each data packet may include a conversation identifier, or other identifying information that identifies the sender, recipient, application, protocol, and/or thread. A communications management system may sniff or investigate incoming packets to determine communications thread information from each packet.

The communications management system transmits packets according to a dynamic policy or some other strategy to optimize certain properties of the communication stream.

At step 220 QoS metrics are determined for each data stream. A communications management system may monitor a network device, such as a router, for performance metrics including information regarding utilization of the device itself, such as throughput, and metrics regarding incoming and outgoing data packets. Such a system may include investigation of each individual packet that is received by the network device. The system may determine metrics regarding the packets, such as metrics regarding latency, dropped packets, and other network related metrics. The communications management system may also determine metrics associated with communications quality and cost, such as QoS metrics. The communications management system may aggregate this data by communications stream or data stream in a QoS database. Thus, other programs can use the QoS database to retrieve historical data regarding QoS data for communications.

In certain embodiments, QoS metrics include statistics regarding quality and reliability of VoIP calls. This may include a measure of bandwidth, equipment/hardware, routing equipment, jitter, latency, propagation delay, handling delay, connection quality and the like. Systems may measure some and or all of the metrics for each data stream.

At step 230 a score is determined for each network path based on the historical and/or real-time QoS metrics for each data stream transmitted over each corresponding network path. For example, particular data streams are transmitted over a first network path to reach a destination IP address. Communications management system may determine a score for that network path based on the QoS metrics for each data stream transmitted over that path. Thus, the system may assign a score to each network path based on the data stream metrics.

In addition to facilitating communication stream scoring, at this point the system may assess the current routing path of each communication data stream. For example, the system may modify the network route for a particular data stream based on the analysis performed in determining a score for the network paths in order to achieve a particular goal. For example, if communication streams sent over a first network path are rated highly, the system may add additional data streams to that path. The system may do this automatically during transmission of the communication data stream, or going forward for additional data streams managed by the system.

This type of route modification may have a few effects or advantages. First, communications may be improved because the best routing paths are selected and data streams are transmitted over the routing paths according to performance score. Another example effect may be alleviating bottle-necks across other lower scoring network routes. For example, reducing the amount of traffic being transmitted across a network path may reduce the latency experienced in the network route and increase performance scores for communications transmitted across those paths. Thus, by optimizing communication paths for particular data communication streams, additional data streams may be accommodated on lower scoring network routes. Further, the scores for those network routes may improve as additional communication streams are transmitted and QoS metrics are generated for those streams.

In certain embodiments communication streams are transmitted across network paths based on a ratio. The ratio may specify the proportion of total data streams in a communications management system that are to be transmitted through a particular network route. The ratio may be adjusted to allocate more data streams for transmission through a particular high scoring network path. Thus, in step 230, the network path scores may be used to set a ratio for data stream routing whereby more data streams are routed along a high scoring route.

At step 240, the ratio may be modified continuously according to changes in the scores for each network path. For example, if call quality and QoS metrics improve for a particular network path, the communications management system may modify the stream routing ratio for the router based to optimize call quality metrics for each communication stream. In certain embodiments, the system may maximize call quality metrics for a group of communication streams managed by the system.

Figure 3:
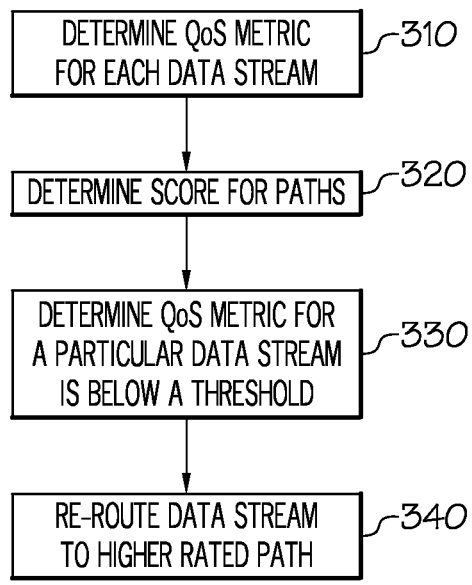
FIG. 3 illustrates a flow chart of a method for VOIP route selection using call metrics in accordance with a non-limiting embodiment of the present disclosure.

With reference to FIG. 3, a method for call routing based on path quality is illustrated in accordance with a non-limiting embodiment of the present disclosure. At step 310, QoS metrics are determined for each data stream transmitted in a system. The data streams may each be associated with a particular organization, with the customers of a particular service provider, or have some other association. Certain embodiments of the present disclosure may merely utilize network monitoring information, path information, and data stream information from an existing system put in place to monitor network activity and performance. Thus, the teachings of the present disclosure may encompass analyzing existing historical and real-time performance data to modify transmission settings for data streams in a packet switched network including network path routing information for a router.

At step 320, scores for each network path are determined. A router may transmit packets across a variety of network paths and routes. The router may be centrally located at an access point or gateway for several internet backbone service providers. Existing routers may randomly select network routes for transmission of data streams. Existing routers may select network routes based on information in a look up table that specifies the path for a packet with a particular destination IP. Such routing may occur without regard for how previous data-packets associated with the current packet were transmitted. Accordingly, extrapolating network path information from call quality metrics for communication streams may not be possible or may be highly inaccurate.

The teachings of the present disclosure may associate data packets with a particular data stream and transmit the stream across a particular network path. Thus, when call quality metrics are determined for the communication session associated with the data stream, the call quality metrics may be extrapolated to estimate the performance of the network path that carries the data stream. Accordingly, scores may be generated for each network path that carries communications.

At step 330, QoS metrics for a particular stream is determined to be below a particular threshold. Communications management system may scan data streams managed by the system to ensure that each communication stream is experiencing sufficient call quality. Thresholds may be specified for unacceptable levels of service. When the system determines that these threshold levels are reached or exceeded, the system may determine a new network path for routing the communication stream over with the goal of improving or optimizing the performance of the data stream. For example, if a significant number of packets are dropped for a particular VoIP call, the communications management system may re-route the data stream to use a new network path. The new network path may have a high score than the existing path based on historical call quality metrics for data streams transmitted over the new path.

At step 340, the ratio of data streams is modified to account for the reduced performance of the failing network path.

The teachings of the present disclosure may additionally be implemented in order to achieve a particular goal. For example, the goal may include optimizing performance of each data stream associated with a particular organization. The goal may include satisfying a service agreement, such as ensuring that call quality meets the standards that one party is contractually obligated to provide. The goal may include reducing costs. For example, certain high speed networks may charge a premium for data transmission but may ensure reliable secure communications. The teachings of the present disclosure may ensure that cost is optimized for a communications session. In certain embodiments, the overall cost of an organization as a whole may be a factor in determining the call routing ratio or the placement of any particular data stream.

In certain embodiments, data streams may have a priority and may be routed according to their priority.

In certain embodiments, communications management application collects historical information regarding network traffic. For example, a router's network traffic may be monitored for network packets including path, header, payload, destination, and protocol information. These packets, or information regarding them, may be stored in a performance monitoring database.

The teachings of the present disclosure may be implemented in connection with a simulation application for simulating the effects of routing changes, such as the changes suggested by the system in accordance with FIGS. 2 and 3 of the present disclosure.

Historical network traffic information may be used to simulate effects of proposed routing rule changes. For example, simulation packets may be generated for each packet for which historical network information data is collected. These simulation packets may be routed in a routing simulation. One or more routers and hosts may also be simulated in the routing simulation. The simulation packets may be routed along routing paths by the one or more routers based on the proposed routing rules. Changes to the routing paths between the simulation and the historical routing paths of each network packet may be compared. The system may determine an unintended change in the network paths for a historical network packet and determine whether or not to apply the routing configuration change to the router.

In certain embodiments, one or more other considerations are considered when determining whether to apply the change, such as the importance of the historical network packet. For example, if the destination of the historical packet is obsolete, the system may ignore the change in path and may apply the routing change notwithstanding the unintended consequences.

In certain embodiments, various aspects of the historical network traffic are used to determine a network path change or whether or not to apply the routing modification to the router. For example, historical packet information may include network layer information such as protocol information (e.g., TCP/IP, UDP/IP, and/or FTP) and a destination application that the packet is routed to (e.g., a web server or an FTP server). The system may simulate the new routing configuration and may determine whether changes in the routing of historical network packets would cause errors. For example, if historical packet information regarding FTP packets was suddenly routed to a web server in the routing simulation, the system would detect and/or mitigate the modification. For example, the system may alert an administrator or may determine that it should not apply the routing configuration based on the change in the path.

In certain embodiments, the system may modify the routing configuration settings to mitigate detected problems. Using the example described above, the proposed routing configuration from the routing simulation may be modified to direct the packets to the FTP server, while still allowing the routing configuration changes to affect other network packets. For example, a carve-out in the rule may be created for the particular type of historical traffic impacted by the routing configuration setting.

The present disclosure contemplates management and tracking of nearly any router settings, including but not limited to access control settings, application rule settings, auto channel and channel scan settings, DHCP server settings, DMZ settings, DNS settings, Dynamic DNS (DDNS) settings, firewall settings, firmware settings, gateway settings, filters, internet IP settings, MAC address settings, Mac address filter settings, max idle time settings, maximum transmission unit settings, port forwarding settings, point to point protocol over Ethernet (PPPoE) settings, pre-shared key settings, subnet mask settings, logging settings, visibility status settings, website filter settings, security settings, wireless channel settings, network name settings, wired equivalent privacy (WEP) and Wi-Fi Protected Access (WPA) settings, and security mode settings.

In certain configurations, the severity of the interruption may be assessed. For example, network interruptions may be detected as changes between the simulated routing path and the historical routing paths. Some changes may result in an interruption of the network traffic, for example with reference to the above described FTP/TCP example. Thus, the detected change in this scenario may lead to an interruption. Interruptions may be considered when evaluating the severity of path changes. Other factors may additionally be considered when evaluating path changes, such as the importance of an application associated with the network traffic. For example a client facing application is associated with particular IP packets based on the destination address and packet structure of the simulated IP packet. The importance of the change in the routing path may be estimated based on the destination application as determined with reference to the contents of the IP packet including header and payload information. For example, client facing applications may be the most important because any down time will reflect poorly on a company. Accordingly changes discovered in the simulated routing path of IP packets associated with client facing applications may be immediately escalated and may prevent implementation of a proposed routing policy.

In certain embodiments, packet structure of the payload of the packet may provide additional clues as to the intended destination of the IP packet and other associated packets within a particular data stream. Thus, the new routing path may be evaluated in light of this additional information. For example, if the structure of the IP packet is compatible with the destination in the simulated routing path, no interruption or change may be triggered because this most likely is an intended change.

In certain configurations, the proposed settings may be automatically modified to mitigate the perceived interruption or change. For example, a new rule or a modification to the proposed rule may be constructed to alleviate and prevent the perceived interruption or change. This new rule may include a carve-out exception for particular packets that are similar to those packets in the historical data for which the change or interruption was detected. For example, the carve-out may route additional new traffic based on the modified policy but may carve out an exception for future packets that are similar to those historical packets. The carve-out may be implemented automatically, tested using the simulated routing packets and applied to the routing node 50 with the proposed routing policy.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining quality-of-service (QoS) metrics for each of a plurality of data streams routed by a node according to a stream-routing ratio that specifies a proportion of total data streams to be routed over each of a plurality of network paths;
   determining a quality score for each of the plurality of network paths based on the QoS metrics;
   modifying the stream-routing ratio based on the quality scores for the plurality of network paths to produce a modified ratio for routing new data streams, the modified ratio being selected to leverage particular ones of the plurality of network paths having high quality scores; and
   applying the modified ratio to the node.

2. The method of claim 1, further comprising:
   determining that the QoS metric for a particular data stream in the plurality of data streams has fallen below a threshold level, the particular data stream being routed over a first network path in the plurality of network paths; and
   routing the particular data stream over a new network path in the plurality of network paths, the quality score for the new network path being greater than the quality score for the first network path.

3. The method of claim 1, further comprising:
   receiving a new network path;
   determining that the quality score for a particular network path in the plurality of network paths is below a predetermined threshold; and
   replacing the particular network path with the new path.

4. The method of claim 1, wherein each quality score is further determined based on a cost of each of the plurality of network paths.

5. The method of claim 1, wherein each of the plurality of network paths comprise a different tier 1 network.

6. The method of claim 1, wherein the call quality metrics comprise delay, jitter, R-Factor, and mean opinion scores (MOS).

7. The method of claim 1, wherein the call quality metrics comprise latency, packet loss, answer seizure Ratio (ASR), network effectiveness Ratio (NER), and average call duration (ACD).

8. A computer configured to access a storage device, the computer comprising:
   a processor; and
   a non-transitory, computer-readable storage medium storing computer-readable instructions that when executed by the processor cause the computer to perform:
      determining quality-of-service (QoS) metrics for each of a plurality of data streams routed by a node according to a stream-routing ratio that specifies a proportion of total data streams to be routed over each of a plurality of network paths;
      determining a quality score for each of the plurality of network paths based on the QoS metrics;
      modifying the stream-routing ratio based on the quality scores for the plurality of network paths to produce a modified ratio for routing new data streams, the modified ratio being selected to leverage particular ones of the plurality of network paths having high quality scores; and
      applying the modified ratio to the node.

9. The computer of claim 8, wherein the computer-readable instructions further cause the computer to perform:
   determining that the QoS metric for a particular data stream in the plurality of data streams has fallen below a threshold level, the particular data stream being routed over a first network path in the plurality of network paths; and
   routing the particular data stream over a new network path in the plurality of network paths, the quality score for the new network path being greater than the quality score for the first network path.

10. The computer of claim 8, wherein the computer-readable instructions further cause the computer to perform:
   receiving a new network path;
      determining that the quality score for a particular network path in the plurality of network paths is below a predetermined threshold; and
      replacing the particular network path with the new path.

11. The computer of claim 8, wherein each quality score is further determined based on a cost of each of the plurality of network paths.

12. The computer of claim 8, wherein each of the plurality of network paths comprise a different tier 1 network.

13. The computer of claim 8, wherein the call quality metrics comprise delay, jitter, R-Factor, and mean opinion scores (MOS).

14. The computer of claim 8, wherein the call quality metrics comprise latency, packet loss, answer seizure Ratio (ASR), network effectiveness Ratio (NER), and average call duration (ACD).

15. A computer program product comprising:
   a computer-readable storage medium having computer-readable program code embodied therewith, the computer-readable program code comprising:
      computer-readable program code configured to determine quality-of-service (QoS) metrics for each of a plurality of data streams routed by a node according to a stream-routing ratio that specifies a proportion of total data streams to be routed over each of a plurality of network paths;
      computer-readable program code configured to determine a quality score for each of the plurality of network paths based on the QoS metrics;
      computer-readable program code configured to modify the stream-routing ratio based on the quality scores for the plurality of network paths to produce a modified ratio for routing new data streams, the modified ratio being selected to leverage particular ones of the plurality of network paths having high quality scores; and
      computer-readable program code configured to apply the modified ratio to the node.

16. The computer program product of claim 15, wherein the computer-readable program code further comprises:
   computer-readable program code configured to determine that the QoS metric for a particular data stream in the plurality of data streams has fallen below a threshold level, the particular data stream being routed over a first network path in the plurality of network paths; and
   computer-readable program code configured to route the particular data stream over a new network path in the plurality of network paths, the quality score for the new network path being greater than the quality score for the first network path.

17. The computer program product of claim 15, wherein the computer-readable program code further comprises:
   computer-readable program code configured to receive a new network path;
   computer-readable program code configured to determine that the quality score for a particular network path in the plurality of network paths is below a predetermined threshold; and
   computer-readable program code configured to replace the particular network path with the new path.

18. The computer program product of claim 15, wherein each quality score is further determined based on a cost of each of the plurality of network paths.

19. The computer program product of claim 15, wherein each of the plurality of network paths comprise a different tier 1 network.

20. The computer program product of claim 15, wherein the call quality metrics comprise delay, jitter, R-Factor, and mean opinion scores (MOS).

* * * * *